United States Patent [19]

Block

[11] Patent Number: 4,627,588

[45] Date of Patent: Dec. 9, 1986

[54] INFANT ARTICLE SUSPENSION STRUCTURE

[76] Inventor: Richard M. Block, 1340 Custer St., Cincinnati, Ohio 45208

[21] Appl. No.: 648,659

[22] Filed: Sep. 7, 1984

[51] Int. Cl.[4] ........................................... F16M 13/32
[52] U.S. Cl. .................................. 248/163.2; 248/105; 446/227
[58] Field of Search ................... 248/163.2, 163.1, 122, 248/102, 105, 106, 107; 211/182; 446/227

[56] References Cited

U.S. PATENT DOCUMENTS

| | | | |
|---|---|---|---|
| 355,663 | 1/1887 | Price | 446/227 |
| 1,436,367 | 11/1922 | Sullivan . | |
| 1,548,617 | 8/1925 | LaBelle . | |
| 2,681,782 | 6/1954 | Morishita | 248/122 |
| 2,723,856 | 11/1955 | Thomson . | |
| 2,736,131 | 2/1956 | Lewis, Jr. . | |
| 2,931,603 | 4/1960 | Farah | 248/163.2 X |
| 3,014,307 | 12/1961 | Dupuis . | |
| 3,238,661 | 3/1966 | Herer et al. . | |
| 3,290,817 | 12/1966 | Kravath . | |
| 3,978,610 | 9/1976 | Stubbmann . | |
| 3,993,274 | 11/1976 | Jansen | 248/107 |
| 3,999,727 | 12/1976 | Rennemann | 211/182 X |
| 4,034,945 | 7/1977 | Sato | 248/106 X |
| 4,147,344 | 4/1979 | Lee . | |
| 4,188,745 | 2/1980 | Harvey et al. . | |
| 4,494,465 | 1/1985 | Fick, Jr. | 248/188.5 X |

Primary Examiner—J. Franklin Foss
Assistant Examiner—David L. Talbott
Attorney, Agent, or Firm—Frost & Jacobs

[57] ABSTRACT

A support structure for suspending a plurality of interchangeable infant toys includes a bridge structure supported in an elevated position by supports contacting the floor only in an area about the horizontal ends of the bridge structure. Such support of the bridge structure leaves the area beneath the bridge structure unencumbered and permits flexibility in positioning an infant with respect to toys suspended from the bridge.

13 Claims, 6 Drawing Figures

INFANT ARTICLE SUSPENSION STRUCTURE

TECHNICAL FIELD

The invention relates generally to article suspension devices and more particularly concerns a structure for supporting toys or other amusement or pacification articles for infants in hanging, suspended relationship above a floor or other support surface.

BACKGROUND OF THE INVENTION

It has been long recognized that children, particularly infants, may be amused and mentally stimulated by hanging motif figures, such as paper or plastic cutouts or painted decorations. Typically, such amusement figures are suspended by a wire or string from a support frame designed for releasable attachment to a piece of the infant's furniture, such as a crib or play pen. For example, in U.S. Pat. No. 3,978,610 to Stubbmann, an arcuate rod frame having spring clips at its extremities is used to support a plurality of amusement figures. The figures are suspended from hangers which frictionally engage the rod for spaced positioning of the figures about the frame. The spring clips at the ends of the rod are used to attach the frame to a baby crib.

As exemplified by U.S. Pat. No. 1,436,367 to Sullivan, it is also known to attach a frame for suspending amusement articles to other pieces of infant furniture. The Sullivan patent specifically discloses an inverted U-shaped frame with brackets permanently affixed to its extremities. Screws extend through the brackets for securing the frame to an infant high chair. A device for securing an amusement figure suspension frame to an infant is disclosed in U.S. Pat. No. 3,238,661 to Herer et al wherein a curvular mounting base adapted to encompass the front, sides and back portions of an infant is described.

Several prior art devices for supporting suspension frames for infant amusement figures have been designed to use the weight and action of an infant for their operation. In U.S. Pat. No. 4,188,745 to Harvey et al, for example, a frame is disclosed which may be attached to a flat base. The infant is placed on the flat base with the amusement figures suspended above. The weight of the infant is used to stabilize the base structure. A generally planar frame with a curved end wall which suspends amusement articles above an infant is shown in U.S. Pat. No. 2,723,856 to Thomson. In operation, an infant is placed on the Thomson frame so that he/she will kick the curved end wall and vibrate the suspended amusement figures.

Unfortunately, each of the above described amusement figure support structures suffer from numerous shortcomings. One significant shortcoming is the lack of flexibility permitted by these prior art devices in positioning an infant. For example, the device disclosed in the above mentioned Thomson patent is suitable only for infants lying on their backs. Each of the frame structures designed for attachment to a piece of furniture is limited in flexibility by the restraints imposed by the selected furniture piece.

Additionally, the mental stimulus afforded by suspended amusement figures generally diminishes over time as the infant becomes overly accustomed to the particular suspended figures. In an attempt to overcome the tendency of an infant to become bored over time with the same suspended amusement figure, mobile variations of the above discussed amusement figure suspension device have been developed. A typical mobile frame for suspending amusement figures is disclosed in U.S. Pat. No. 3,280,817 to Kraueth wherein figures are suspended from a freely rotating ring frame. The ring frame rotates upon contact and rotates the suspended amusement figures. Other mobile toy suspensions use spring biased motors to rotate the suspended amusement figures. These mobile toys are generally designed for attachment to a baby crib or play pen. Aside from the added stimulation provided by the resulting movement, these mobile toys suffer from the same shortcomings as the prior art discussed above.

There are also several potential hazards which result from the use of cribs or play pens to support suspended amusement figures. First of all, older infants can frequently use the sides of cribs and play pens to assist in standing or climbing. Moreover, the prior art amusement figure suspension systems designed for attachment to cribs and play pens have frequently lacked high structural integrity. Thus, it is often possible for an infant, after standing in a crib or play pen, to grasp a suspended amusement figure and to pull the supporting frame and suspension strings into the crib or play pen. The potential for accidental chocking or strangulation of an infant from use of such toys is particularly pronounced in a crib or bed where the infant generally spends at least several unsupervised hours a day.

SUMMARY OF THE INVENTION

Accordingly, it is a primary object of the present invention to provide a structure for suspending amusement articles for infants which overcomes the above discussed shortcomings of the prior art.

It is another object of the invention to provide an amusement figure suspension structure for infants which permits substantial flexibility in positioning of the infant.

Another object of the invention is to provide a structure for suspending infant amusement articles wherein the positions of the suspended articles may be modified to accommodate growth and development of the infant.

Yet another object of the invention is to provide a supporting structure which may be used to interchangeably support a variety of different toys.

A still further object of the present invention is to provide a support structure for suspending a plurality of infant toys which discourages climbing by an infant upon the support structure.

Another object of the invention is to provide an infant toy suspension structure which permits virtually unimpaired visual access for supervising and monitoring the infant from all angles.

Still another object of the invention is to provide an article suspension structure for infants which permits an infant seat to be positioned beneath the suspended articles.

It is another object of the invention to provide an amusement article suspension structure for infants which eliminates potential strangulation points on the structure.

Still yet another object of the invention is to provide an article suspension structure for hanging articles from a multiplicity of elevated positions.

A still further object of the present invention is to provide an article suspension structure which may be used to suspend articles at a multitude of vertical heights.

Another object of the invention is to provide an article structure which may be used to support bottles or toys for infants above floor based contaminants.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved self-supporting structure is provided for suspending articles for infants. The structure includes a bridge structure spanning a predetermined horizontal distance. The bridge structure is adapted for suspending one or more articles above a support surface, such as a floor or the ground. At least one suspension member hangs downwardly from the bridge structure for vertically supporting an article above the support surface in a predetermined relationship to an infant positioned substantially beneath the bridge structure. Support means extending from each horizontal end of the bridge to said support surface are provided for supporting the bridge in a vertically elevated position above the support surface. The support means is in contact with the support surface only in the area about the horizontal ends of the bridge so as to leave the area beneath said bridge unencumbered, whereby the support means does not interfere with placement of an infant beneath the bridge.

In one aspect of the invention, the bridge structure is divided into a plurality of discrete sections for hanging suspension members.

A further aspect of the invention includes means for inhibiting horizontal movement of hanging suspension members from one discrete section to another.

In one preferred arrangement of the invention, the bridge structure has an arcuate configuration for high structural strength.

In one preferred form of the invention, the bridge structure is formed by a plurality of interconnected bar members.

According to one specific feature of the invention, the bridge structure is formed by a plurality of series of longitudinally aligned bar members with interconnecting members extending between the longitudinally aligned series of members.

In another specific feature of the invention, the plurality of discrete sections of said bridge structure are defined by fittings interconnecting the series of longitudinally aligned bar members.

In another aspect of the invention, the plurality of discrete sections of said bridge structure are defined by said interconnecting members extending between said longitudinally aligned series.

In yet another aspect of the invention, the support means extends substantially perpendicularly to the predetermined direction of the bridge in a pair of parallel planes at the opposite horizontal ends of said bridge structure.

In one preferred form of the invention, the support means includes a pair of columnar legs extending from the bridge structure to the support surface at opposite horizontal ends of the bridge structure. The columnar legs preferably converge outwardly to define a pair of substantially parallel planes as said legs extend to the support surface.

According to another feature of the invention, the suspension member is adapted for readily interchanging articles supported thereby.

In another aspect of the invention, the suspension members include a plurality of linked split rings interconnected to form a flexible chain-like member for supporting an article above the support surface.

Additional objects of the present invention will become readily apparent to those skilled in this art from the following description wherein there is shown and described a preferred embodiment of this invention, simply by way of illustration of one of the best modes contemplated for carrying out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
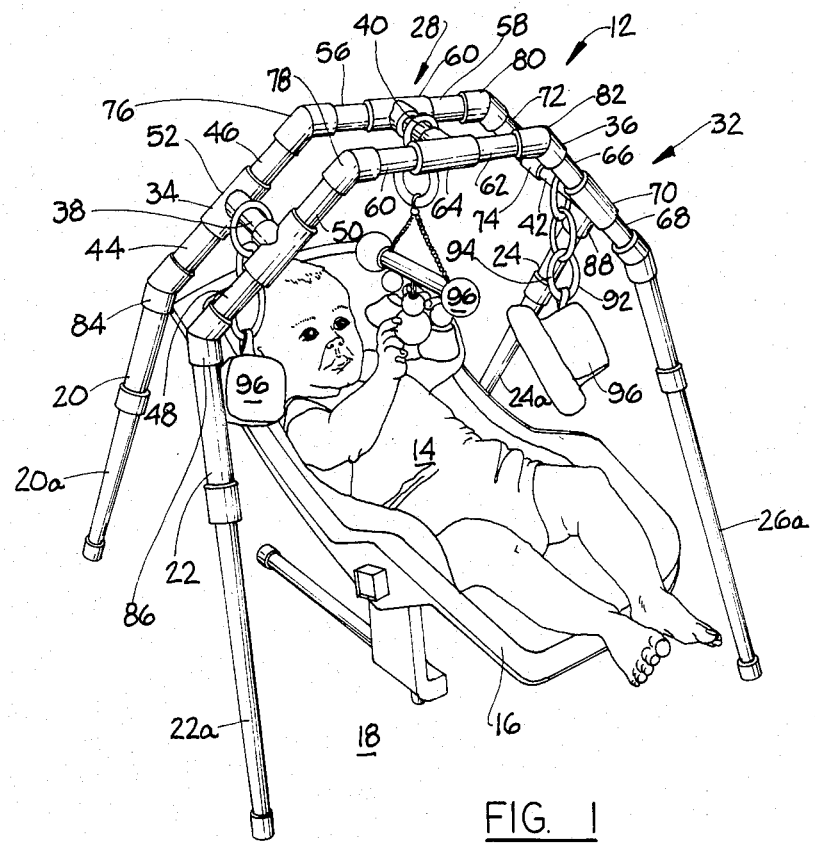
FIG. 1 is a perspective view of an article support structure constructed in accordance with the present invention for hanging a plurality of selected toys before an infant sitting in an infant seat.

Referring now to the drawings, FIG. 1 shows an infant toy display device, generally designated by the numeral 10, constructed in accordance with the principles of the present invention. The illustrated display device is generally formed of a bridge structure 12 adapted for positioning above the chest of an infant 14 In the illustration of FIG. 1, the infant 14 is shown positioned below the bridge structure 12 in an infant seat 16.

The bridge structure 12 is supported in an elevated position above the floor or other support surface 18 by support means extending downwardly from the horizontal extremities of the bridge structure 12 to the floor 18. In the embodiment illustrated in FIG. 1, the support means includes a pair of columnar support legs 20,22 and 24,26 connected to the horizontal ends of the bridge structure 12 and extending downwardly to the floor 18. The legs 20 and 22 define a first plane which is parallel to a second plane defined by the legs 24,26.

The bridge structure 12 illustrated in FIG. 1 has an arcuate configuration and is comprised of a first substantially horizontal central section 28 joined on opposite sides by a pair of obliquely oriented side sections 30 and 32. Each of the sections 28,30,32 is formed by a pair of parallel bar structures 34 and 36 which span the horizontal distance between the support means formed by legs 20,22 and 24,26 in generally perpendicular relationship to the planes defined by the legs 20,22 and 24,26. These parallel bar structures 34,36 are rigidly interconnected by interconnecting members 38,40 and 42.

More specifically, the parallel bar structures 34 and 36 of the illustrated embodiment are formed of a series of longitudinally aligned pipe sections joined by fittings. The side section 30 is formed by pipe sections 44 and 46 of parallel bar structure 34 and by pipe sections 48 and 50 of parallel bar structure 36. Pipe sections 44 and 46 are joined by a T-fitting 52, while pipe sections 48 and 50 are joined by a T-fitting 54. The connecting member 38 is interconnected on opposite ends to the T-fittings 52 and 54 respectively.

The central bridge section 28 of the bridge structure 12 in FIG. 1 is identical to side section 30. This central section 28 is formed by pipe sections 56 and 58 joined by T-fitting 60 and by pipe sections 60 and 62 formed by T-fitting 64. The interconnecting member 40 joins the T-fittings 60 and 64. The side section 32 of parallel bar structure 36 is formed by pipe sections 66 and 68 joined by T-fitting 70. Although partially obscured in FIG. 1, it will be appreciated that the side section 32 of parallel bar structure 34 is similarly formed with pipe section 72 and a non-illustrated pipe section joined by T-fitting 74. The T-fitting 74 cooperates with T-fitting 70 to receive interconnecting member 42 and to rigidly join the parallel bar structures 34,36 inside section 32.

Pipe sections 46 and 50 of bridge side section 30 are joined to pipe sections 56 and 60 of central section 28 by angled fittings 76 and 78 respectively. In a similar manner, angled fittings 80 and 82 join side section 32 with the central section 28.

Angled fittings are also used to join the bridge 12 with the support means formed by leg pairs 20,22 and 24,26 in the illustrated embodiment. Pipe section 44 of side section 30 is joined to leg 20 by an angled fitting 84 while angled fitting 86 joins pipe section 48 with leg 22. The opposite side section 32 of the bridge 12 is joined to legs 24 and 26 by angled fittings 88 and 90 respectively.

As further illustrated in FIG. 1, a plurality of suspension members 92 are attached to the bridge 12 and hanging downwardly therefrom. The suspension members of the preferred embodiment are flexible chain-like members and formed by a series of linked split rings 94. The split rings 94 may be readily unlinked from each other to shorten the suspension members 92. Alternatively, additional split rings 92 may be added by interlocking with the existing split rings to lengthen the suspension members 92. Inasmuch as toys 96 are hung from these suspension members 92, the shortening or lengthening of these suspension members 92 operates to raise or lower the toys 96.

In the illustration of FIG. 1, the suspension members 92 are hung from the three interconnecting members 38,40 and 42. These interconnecting members are conveniently spaced about the horizontal span of the bridge 12 and offer convenient locations for hanging the toys 96. It will further be appreciated that the split rings 94 may be opened and secured about the pipe sections forming parallel bar structures 34 and 36. For example, a suspension member may be readily attached to pipe section 60. In this situation, the fittings 64 and 78 are effective in inhibiting gross lateral sliding movement of the split ring due to the abrupt increase in the external dimension of the parallel bar structures at the fitting interfaces. In this regard, a small amount of horizontal movement is desirable in that it adds to the play and stimulation value of the suspended toys 96. However, gross horizontal movement may result in grouping of a multiplicity of suspended toys at a single location and is undesirable. When the suspension members 92 are hung from the interconnecting members 38,40 and 42, the T-shaped fitting positively inhibits gross horizontal movement.

Figure 6:
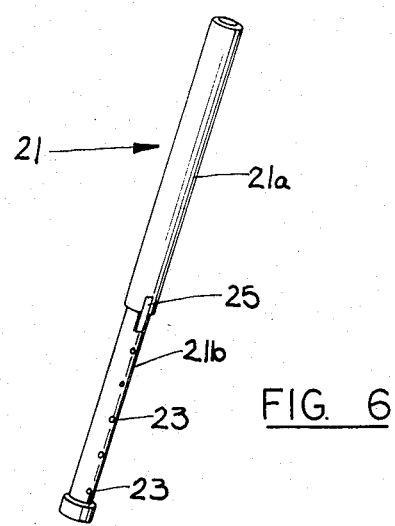
FIG. 6 is a perspective view of a telescopically adjustable columnar support leg for use in the embodiments of FIGS. 1 or 5.

The legs 20,22 and 24,26 may optionally include telescoping sections which are longitudinally translatable with respect to each other for raising or lowering the bridge structure 12. For example, as depicted by leg 21 in FIG. 6, each of the legs 20,22,24 and 26 may include a slidable component concentrically disposed within the outer leg component as depicted by outer and inner leg components 21a and 21b respectively in FIG. 6. FIG. 6 further shows a series of spaced aperatures 23 in the inner leg component 21b. A releasable leg lock 25 includes a pin (not shown) which is selectively insertable into one of aperatures 23 to lock the leg at a predetermined height.

As will be apparent from the above, the position of suspended toys 96 may be modified in several ways. Horizontal position may be readily changed by merely moving the split ring suspension members from one part of the bridge 12 to another. Vertical positioning of the toys 96 may be effectuated by either raising or lowering the bridge 12 or by shortening or lengthening the split ring suspension members 92. Thus, substantial flexibility is provided for not only accommodating growth and development of the infant 14, but also in accommodating varying positions of the infant 14.

Figure 2:
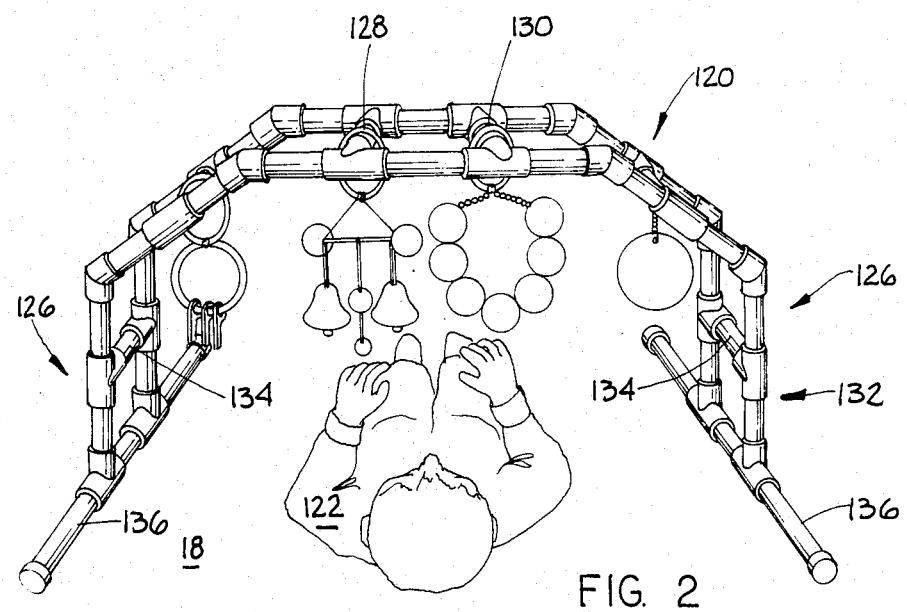
FIG. 2 is a perspective view of a further embodiment of the invention shown spanning a horizontal distance above the chest of an infant and supporting a plurality of suspended toys.

It will be further appreciated that the use of support means which contact the floor or other support surface (such as the ground) 18 only in parallel planes about the horizontal ends of the bridge 12 without encumbering the area beneath the bridge 12 permit the infant to be positioned in a variety of positions. For example, FIG. 1 shows the infant 14 positioned in an infant seat 16. By contrast, FIG. 2 shows an infant lying on the support surface 18 with his/her chest position beneath the bridge 12. Although not specifically illustrated in the drawings, the toy display device of the invention is equally suitable for positioning an infant on his/her stomach with the toys 96 suspended before him/her. In fact, such positioning is frequently advantageous in encouraging the infant to raise his/her neck and to reach and grasp for toys.

The use of the split ring suspension members 94 is also highly advantageous in that it enables the suspension of any of the infant's favorite toys, and is not merely limited to those dedicated toys or figures manufactured for the display device. The ability to change the suspended toys 96 not only permits the infant's favorite toys to be suspended, it also readily accommodates changing the toys 96 to avoid boredom of the infant. This easy interchangeability of toys 96 enables the infant to play with virtually any toy and keeps the toys at a central location to facilitate toy pick-up. Further, suspending the toys 96 above the floor or ground 18 eliminates substantial contamination of the toys 96 from contact with the floor. It will also be appreciated that bottles or pacifiers may be suspended from the display device 10.

Figure 5:
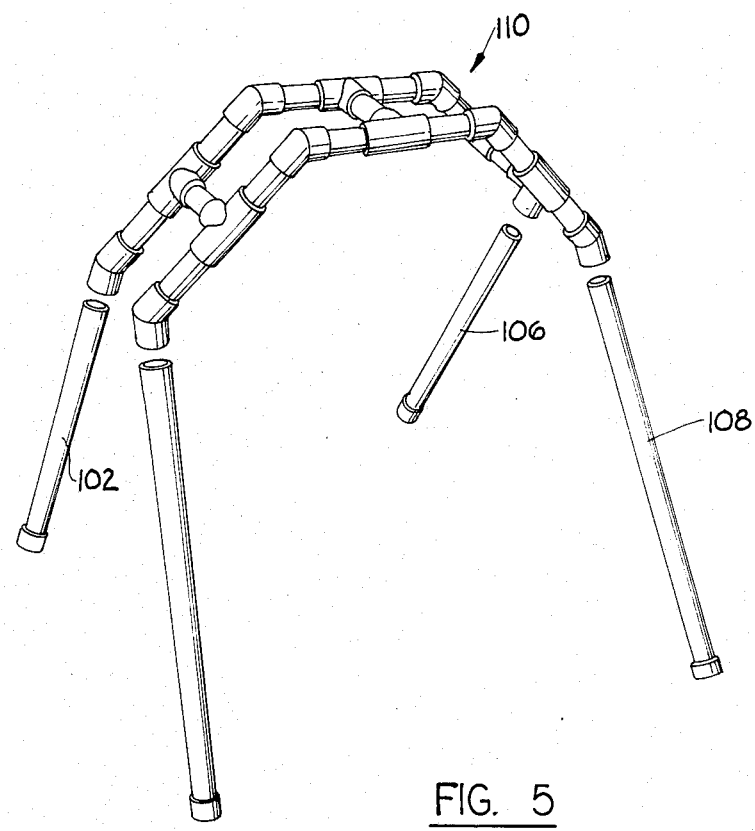
FIG. 5 is a perspective view of a somewhat modified embodiment of the article support structure of FIG. 1 depicting the legs separated from the bridge structure for compact storage and portability.

Turning now to FIG. 5, a toy display structure 100 is shown with four columnar legs 102,104,106 and 108 separated from a bridge structure 110. The display structure is identical to the display structure 10 of FIG. 1 except that the legs 102,104,106 and 108 do not telescope. However, toys suspended from the bridge 110 may be readily raised or lowered by lengthening or shortening the split ring suspension members 92. As suggested by the depiction of FIG. 5, the support means for holding the bridge structure in an elevated position is preferably detachable from the bridge for compact storage.

A still further embodiment of the invention is depicted in FIG. 2. In the FIG. 2 embodiment, an arcuate bridge structure 120 is shown supported in elevated position above the chest of an infant 122 by a support means 126 which contacts the floor 13 only in parallel planes on opposite horizontal sides of the bridge 120. Thus, like the embodiments of FIGS. 1 and 5, the support means of FIG. 2 does not encumber the area beneath the bridge structure 120.

The bridge structure of FIG. 2 is constructed in a manner similar to the previously described structure of FIG. 1 and a detailed description will be omitted in the interests of brevity. It is noted, however, that the central section of the bridge structure 120 is slightly longer than the corresponding central section 28 of bridge structure 12 in FIG. 1, and that the central section of bridge structure 120 includes two interconnecting members 128 and 130.

It will be further noted that support means 126 includes a pair of vertically oriented columnar members 132 at each horizontal end of the bridge structure 120. Like the previously described structures, each of the columnar members 132 is formed from a plurality of individual pipe sections joined by fittings. Each columnar member 132 is joined with its paired member 132 by an interconnecting member 134. Each pair of columnar members 132 is joined to a base rod 136 extending perpendicularly to both the columnar members 132 and to the bridge structure 120. As previously suggested, the base rods are disposed in the planes defined by the pairs of columnar members 132.

Figure 3:
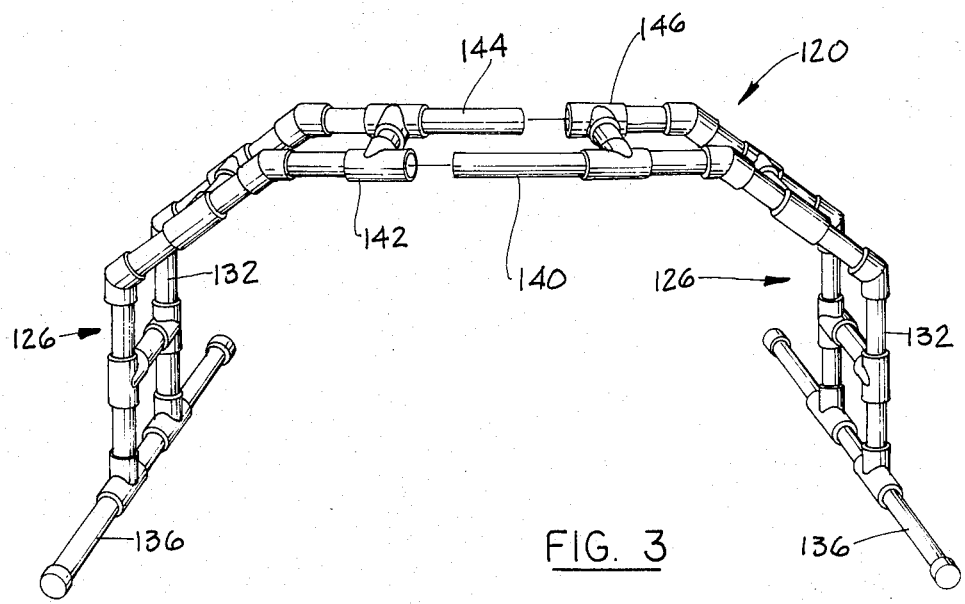
FIG. 3 is a perspective view of a portion of the article supporting structure of FIG. 2 showing two halves of the structure separated for storage.
Figure 4:
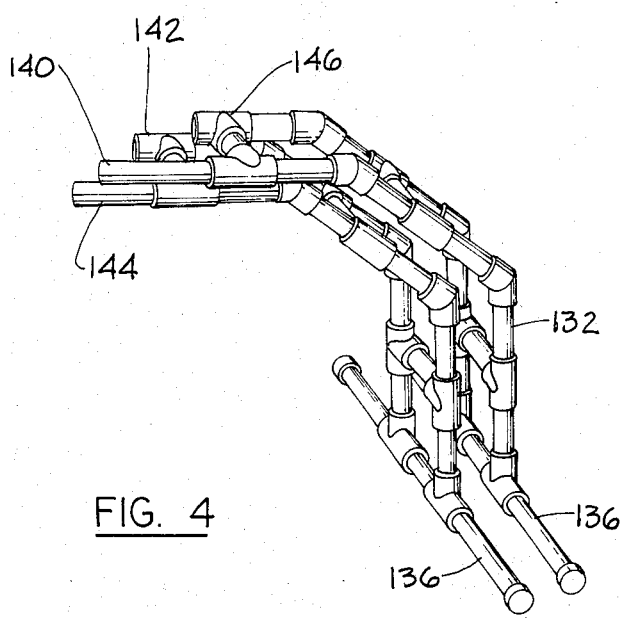
FIG. 4 is a perspective view of the supporting assesmbly of FIG. 3, but depicting one of the two halves rotated and placed in nesting relationship with the other half for compact storage and portability.

FIG. 3 shows the embodiment of FIG. 2 separated in the central section of the bridge 120 for storage purposes. Specifically, the junctures between a first pipe section 140 and a fitting 142 is separated as is a juncture between a second pipe section 144 and a fitting 146. With the bridge structure 120 separated in this manner, one of the resulting halves of the display device structure may be rotated and rested with the other half section for compact storage, as depicted in FIG. 4.

In summary, numerous benefits have been described which result from employing the concepts of the present invention. An article suspension structure is provided which permits substantial flexibility in positioning an infant beneath a bridge structure for suspending toys or other articles before an infant. The suspension structure is self-supporting and provides an unencumbered area beneath the bridge for positioning the infant in any number of positions, as for example, in an infant seat. The support means for the bridge also allows monitoring of an infant from all angles with virtually unimpeded vision. The structure is lightweight and readily portable. The structure includes a suspension member for hanging a plurality of toys. Preferably, this suspension member is formed by a series of interlocked split rings, which rings may be added or subtracted from the series to lengthen or shorten the suspended toy.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A self-supporting structure for supporting one or more articles above an infant, comprising:

(a) a bridge structure spanning a predetermined horizontal distance, said bridge structure including a pair of rigidly interconnected parallel bar structures, each of said parallel bar structures having an arcuate configuration and being adapted for suspending one or more articles above a support surface, each of said parallel bar structures being formed by a series of longitudinally aligned pipe sections joined by interconnecting fittings;

(b) at least one suspension member hanging downwardly from said bridge structure for vertically supporting an article above the support surface in a predetermined relationship to an infant positioned substantially beneath said bridge structure; and (c) support means extending from each horizontal end of said bridge to said support surface for supporting said bridge in a vertically elevated position above the support surface, said support means being in contact with the support surface only in the area about the horizontal ends of said bridge and leaving the area beneath said bridge unencumbered, whereby the support means does not interfere with placement of an infant beneath the bridge.

2. A self-supporting structure as recited in claim 1 wherein said support means extends substantially perpendicularly to said predetermined horizontal distance in a pair of parallel planes at the opposite horizontal ends of said bridge structure.

3. A self-supporting structure as recited in claim 1 wherein said support means includes a plurality of columnar support members.

4. A self-supporting structure as recited in claim 3 wherein said support means includes a pair of columnar legs extending from the bridge structure to the support surface at opposite horizontal ends of the bridge structure.

5. A self-supporting structure as recited in claim 4 wherein each of said columnar legs includes at least two longitudinally translatable sections telescopically movable with respect to each other to raise and lower the bridge structure with respect to the support surface for altering the position of the bridge structure with respect to the support surface.

6. A self-supporting structure as recited in claim 4 wherein said columnar legs converge outward to define a pair of substantially parallel planes as said legs extend to the support surface.

7. A self-supporting structure as recited in claim 1 wherein said suspension member is adapted for readily interchanging articles supported thereby.

8. A self-supporting structure as recited in claim 1 wherein said suspension members include a plurality of linked split rings interconnected to form a flexible chain-like member for supporting an article above the support surface, said split rings being operative for interchanging articles supported by the suspension member.

9. A self-supporting structure as recited in claim 1 wherein said parallel bar structures are separated by not more than three inches to eliminate the possibility of the entry of an infant's head.

10. A self-supporting structure as recited in claim 1 wherein the interconnecting fittings have an external dimension greater than the external dimension of the pipe sections so that the external dimension of the parallel bar structures increase abruptly at the interfaces between the pipe sections and the fittings, the abrupt increase in the dimension of the parallel bar structures being operative to inhibit gross sliding movement thereover.

11. An infant toy display device for suspending infant toys above a floor, comprising:
(a) an arcuate bridge formed by a plurality of parallel bars rigidly secured to each other by a plurality of interconnecting members, each of said parallel bars being divided into a plurality of discrete sections;
(b) a pair of columnar support legs extending downwardly from each end of the arcuate bridge to the floor for supporting the bridge in an above the floor elevated position, each pair of said columnar support legs diverging as they extend downwardly from the bridge, the planes defined by the two pair of columnar support legs being substantially parallel to each other and substantially perpendicular to the parallel bars;
(c) a chain formed by a plurality of interconnected split rings hanging downwardly toward the floor from the bridge for attaching to and suspending toys above the floor; and
(d) means for inhibiting gross movement of said chain on said bridge.

12. An infant toy display device as recited in claim 11 wherein said parallel bars are formed by a plurality of bars interconnected by fittings and wherein said movement inhibiting means includes a sudden increase in the external dimension of said parallel bars at the interface of the fittings and the interconnected bars.

13. An infant toy display device as recited in claim 12 wherein the height of the chain above the floor is adjustable.

* * * * *